(12) United States Patent
Zhao

(10) Patent No.: US 10,776,422 B2
(45) Date of Patent: Sep. 15, 2020

(54) DUAL SOUND SOURCE AUDIO DATA PROCESSING METHOD AND APPARATUS

(71) Applicant: TENCENT TECHNOLOGY (SHENZHEN) COMPANY LIMITED, Shenzhen, Guangdong (CN)

(72) Inventor: Weifeng Zhao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/100,698

(22) Filed: Aug. 10, 2018

(65) Prior Publication Data

US 2018/0349493 A1    Dec. 6, 2018

Related U.S. Application Data

(63) Continuation of application No. PCT/CN2017/103106, filed on Sep. 25, 2017.

(30) Foreign Application Priority Data

Sep. 27, 2016 (CN) .......................... 2016 1 0852918

(51) Int. Cl.
*G06F 16/683* (2019.01)
*G10H 1/36* (2006.01)
(Continued)

(52) U.S. Cl.
CPC .......... *G06F 16/685* (2019.01); *G06F 40/205* (2020.01); *G10H 1/366* (2013.01);
(Continued)

(58) Field of Classification Search
CPC ........ G06F 3/16; G06F 3/165; G06F 17/2705; G06F 16/60; G06F 16/63; G06F 16/632;
(Continued)

(56) References Cited

U.S. PATENT DOCUMENTS

2002/0091455 A1* 7/2002 Williams ............. G10H 1/0058
700/94
2006/0273936 A1* 12/2006 Matsuoka ............ G10H 1/0066
341/50
(Continued)

FOREIGN PATENT DOCUMENTS

CN         1173689 A      2/1998
CN       101174409 A      5/2008
(Continued)

OTHER PUBLICATIONS

International Search Report for PCT/CN2017/103106 dated Dec. 22, 2017 [PCT/ISA/210].

*Primary Examiner* — Andrew C Flanders
(74) *Attorney, Agent, or Firm* — Sughrue Mion, PLLC

(57) ABSTRACT

A dual sound source audio data processing method and apparatus are provided. The method includes obtaining audio data of a song pair including a first song and a second song, the first and second songs having a same accompaniment audio but different voice audio. The audio data is decoded to obtain first mono audio data corresponding to the first song and second mono audio data corresponding to the second song. The first and second mono audio data are combined to one piece of two-channel audio data including a left audio channel and a right audio channel. A play time of the two-channel audio data is divided into play periods, and energy suppression is selectively performed on the left audio channel and the right audio channel in different play periods.

17 Claims, 10 Drawing Sheets

(51) Int. Cl.
  *G06F 40/205* (2020.01)
  *G10H 1/46* (2006.01)
  *G10L 19/008* (2013.01)

(52) U.S. Cl.
  CPC .......... *G10H 1/46* (2013.01); *G10H 2210/031* (2013.01); *G10H 2210/051* (2013.01); *G10H 2210/056* (2013.01); *G10H 2210/061* (2013.01); *G10H 2240/036* (2013.01); *G10H 2240/141* (2013.01); *G10H 2240/325* (2013.01); *G10H 2250/135* (2013.01); *G10L 19/008* (2013.01)

(58) Field of Classification Search
  CPC ...... G06F 16/635; G06F 16/68; G06F 16/683; G06F 16/685; G06F 16/686; G10H 2240/036; G10H 2240/325; G10H 1/361; G10H 220/011; G10H 220/145; G10H 2240/121–155; G10H 1/36–42
  USPC ....................................................... 434/307 A
  See application file for complete search history.

(56) References Cited

U.S. PATENT DOCUMENTS

| | | | | |
|---|---|---|---|---|
| 2009/0038467 A1* | 2/2009 | Brennan | ................. | G09B 5/00 84/609 |
| 2009/0044688 A1* | 2/2009 | Matsumoto | .......... | G10H 1/0058 84/609 |
| 2009/0070420 A1* | 3/2009 | Quackenbush | .......... | G10H 1/00 709/204 |
| 2013/0305903 A1* | 11/2013 | Fong | ........................ | G10H 1/26 84/609 |
| 2014/0037111 A1* | 2/2014 | Uhle | ...................... | H04H 60/04 381/119 |
| 2014/0039883 A1* | 2/2014 | Yang | ....................... | G10H 1/366 704/207 |
| 2014/0180685 A1* | 6/2014 | Ono | .................... | G10L 21/0272 704/233 |
| 2014/0190335 A1* | 7/2014 | Wieder | ................ | G10H 1/0025 84/609 |
| 2016/0005416 A1* | 1/2016 | Salazar | ................. | G10H 1/366 704/207 |
| 2016/0078853 A1* | 3/2016 | Gonczi | ................... | A63F 13/42 700/92 |
| 2016/0358595 A1* | 12/2016 | Sung | ...................... | G10H 1/368 |
| 2016/0372096 A1* | 12/2016 | Lyske | ...................... | G10H 1/40 |

FOREIGN PATENT DOCUMENTS

| CN | 101211643 A | 7/2008 |
|---|---|---|
| CN | 101630507 A | 1/2010 |
| CN | 103297805 A | 9/2013 |
| CN | 104053120 A | 9/2014 |
| CN | 106486128 A | 3/2017 |

* cited by examiner

Flyric
"[ti: Red Rose]
[ar: Eason Chan]
[offset:0]
[00:01.00] Red Rose - Eason Chan
[00:03.93] lyrics: Francis Lee
[00:06.63] music: Kubert Leung
[00:08.61]
[00:16.28]aaaaaaaaa
[00:18.65]xxxxxxxx
[00:23.53]xxxxxxxxxx
[00:26.77]xxxxx
[00:30.01]xxxxxxxx

FIG. 5(a)

Flyric
"[ti: White Rose]
[ar: Eason Chan]
[offset:0]
[00:01.00] White Rose - Eason Chan
[00:03.93] lyrics: Francis Lee
[00:06.63] music: Kubert Leung
[00:08.61]
[00:16.28]bbbbbbbbb
[00:18.65]xxxxxxxx
[00:23.53]xxxxxxxxxx
[00:26.77]xxxxx
[00:30.01]xxxxxxxx

FIG. 5(b)

Flyric
"[ti: Red Rose]
[ar: Eason Chan]
[offset:0]
[00:01.00] Red Rose - Eason Chan
[00:03.93] lyrics: Francis Lee
[00:06.63] music: Kubert Leung
[00:08.61]
[00:16.28]aaaaaaaaa
[00:18.65]xxxxxxxx
[00:23.53]xxxxxxxxxx
[00:26.77]xxxxx
[00:30.01]xxxxxxxx

[01:03.40]xxxx xxxxx
[01:06.95]xxxx xxxxxx
[01:11.32]xxxxxxxxxx
[01:14.63]xxx
[01:16.66]
[01:31.15]xxxxxxxxx
[01:33.77]xxxxxxxx
[01:38.45]xxxxxxxxxx

FIG. 6

DUAL SOUND SOURCE AUDIO DATA PROCESSING METHOD AND APPARATUS

CROSS-REFERENCE TO RELATED APPLICATIONS

This application is a continuation of International Patent Application No. PCT/CN2017/103106, filed on Sep. 25, 2017, which claims priority from Chinese Patent Application No. 201610852918.8, filed with the Chinese Patent Office on Sep. 27, 2016 and entitled "DUAL SOUND SOURCE AUDIO DATA PROCESSING METHOD AND APPARATUS", the disclosures of which are incorporated by reference herein in their entirety.

BACKGROUND

1. Field

The present disclosure relates to the field of computer information processing technologies, and specifically to a dual sound source audio data processing method and apparatus.

2. Description of Related Art

People expect more fun from music with the popularity of multimedia devices. In addition to listening to single music, remixed music and medley songs are also popular.

SUMMARY

It is an aspect to provide a dual sound source audio data processing method and apparatus and a non-volatile computer readable storage medium that may make two songs having a same accompaniment but sung differently be automatically synthesized.

According to an aspect of one or more example embodiments, there is provided a method. The method includes obtaining audio data of a song pair including a first song and a second song, the first and second songs having a same accompaniment audio but different voice audio. The audio data is decoded to obtain first mono audio data corresponding to the first song and second mono audio data corresponding to the second song. The first and second mono audio data are combined to one piece of two-channel audio data including a left audio channel and a right audio channel. A play time of the two-channel audio data is divided into play periods, and energy suppression is selectively performed on the left audio channel and the right audio channel in different play periods According to other aspects of one or more example embodiments, there is also provided an apparatus and computer readable medium consistent with the method.

BRIEF DESCRIPTION OF THE DRAWINGS

Example embodiments are described below with reference to the accompanying drawings, in which:

FIG. 5(a) and FIG. 5(b) is a schematic diagram of a lyrics file of a same-origin song pair according to an embodiment;

FIG. 6 is a schematic diagram of an accompaniment file of a same-origin song pair according to an embodiment;

DETAILED DESCRIPTION

Figure 1:
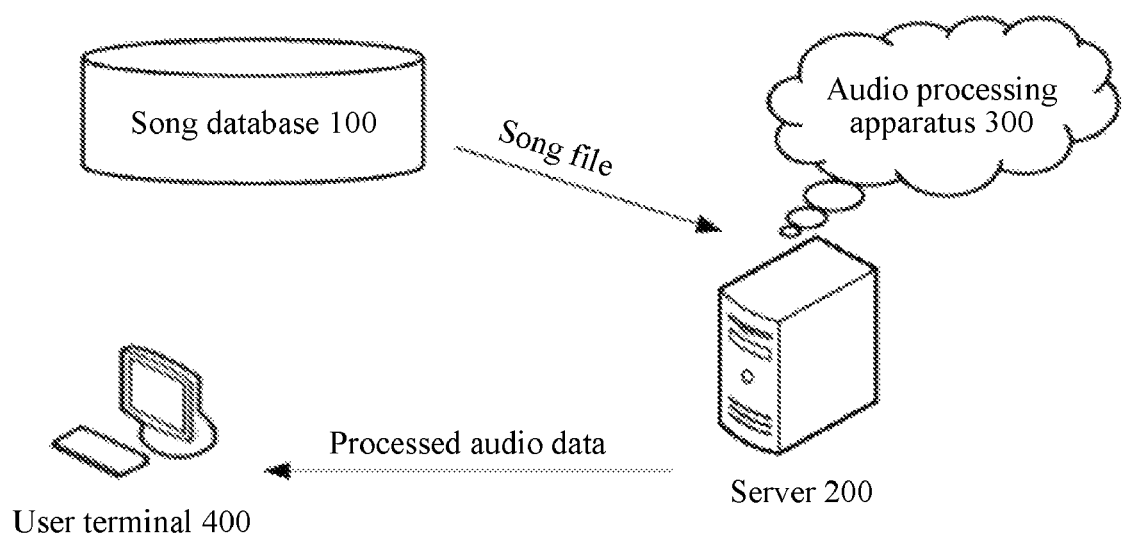
FIG. 1 is a schematic scenario diagram of a dual sound source audio data processing method according to an embodiment.

The following further describes this application in detail with reference to the accompanying drawings and the embodiments. It may be understood that, the specific embodiments described herein are merely illustrative, but are not limited to the description herein. In addition, it should be noted that, for ease of description, the accompanying drawings only show parts relevant to the related exemplary embodiment.

In the following description, the specific embodiments are described with reference to steps and symbols of operations performed by one or more computers, unless otherwise stated. As such, it will be understood that such steps and operations, which are at times referred to as being computer-executed, include the manipulation by the processing unit of the computer of electrical signals representing data in a structured form. This manipulation converts the data or maintains the location of the data in a memory system of the computer, which can be reconfigured, or otherwise a person skilled in this art changes the way of operation of the computer in a well-known manner. The data structure maintained in the physical location of the data in the memory has specific properties defined by the data format. However, the principle of the present disclosure described in the foregoing text does not lead to a limitation. A person skilled in the art may understand that the various steps and operations described below may also be implemented in hardware.

A term "module" used in the specification may be regarded as a software object executed in the calculation system. Different components, modules, engines, and services described in the specification may be regarded as objects implemented in the calculation system. The apparatus and method described in the specification is preferably implemented in a form of software, and definitely can be implemented in a form of hardware, both of which fall within the protection scope of the present disclosure.

Embodiments provide a dual sound source audio data processing method and apparatus.

In the embodiments, two songs having a same accompaniment but sung differently are used as a same-origin song pair. Two pieces of mono audio data are obtained by decoding audio data of the same-origin song pair, the two pieces of mono audio data are combined to one piece of two-channel audio data, play time corresponding to the two-channel audio are divided to multiple play periods, and energy suppression are performed on a left audio channel or a right audio channel of the two-channel audio in different play periods, so that an effect that the two songs having a same accompaniment but sung differently are sung alternately is achieved. The embodiments provide a novelty solution that music is automatically synthesized, to provide a new function for a computer device. Both lyrics information and accompaniment information of the two songs used for synthesizing is the same. Therefore, an obtained audio is relatively gentle, no abrupt sense is generated thereof, and a comfortable listening effect is achieved. Moreover, regardless of the same-origin song pair is obtained or the audio data is processed, both are performed in background on a user terminal side. A user selects a synthesized audio on a user terminal to play, and does not need to manually select the same-origin song pair and process the audio data, so that an operation on the user terminal is simplified, and a processing resource of the user terminal is saved. In addition, compared with a manner that a music work is recorded by being sung live by a singer, the embodiments have advantages of low costs and high synthetic efficiency.

Referring to FIG. 1, FIG. 1 is a schematic scenario diagram of a dual sound source audio data processing method according to an embodiment. The scenario may include an audio data processing apparatus running in a server 200, and the audio data processing apparatus is referred to as an audio processing apparatus 300 and mainly configured to obtain audio data of a same-origin song pair, where the same-origin song pair includes two songs having a same accompaniment but sung differently. Then, the audio data of the same-origin song pair are separately decoded, to obtain two pieces of mono audio data. Afterwards, the two pieces of mono audio data are combined to one piece of two-channel audio data. Finally, play time corresponding to the two-channel audio are divided to multiple play periods, and energy suppression is performed on a left audio channel or a right audio channel of the two-channel audio in different play periods, to obtain processed audio data.

In addition, the scenario may further include a song database 100. The song database stores a large quantity of pieces of song information, where accompaniment files, lyrics files and audio data corresponding to songs are included. The audio processing apparatus 300, according to lyrics files and accompaniment files of songs in the database 100, filters out a same-origin song pair including two songs having a same accompaniment but sung differently. Certainly, the scenario may further include a user terminal 400 such as a mobile phone or a tablet computer. The user terminal includes an input apparatus (such as a keyboard or a mouse) and an output apparatus (such as a screen and a power amplifier). A user selects audio data processed by the audio processing apparatus 300 by activating the input apparatus, and plays the processed audio data by using an output apparatus.

Detailed descriptions are provided below separately.

In this embodiment, from points of view of the audio processing apparatus, the audio processing apparatus may specifically integrated on a network device such as a server or a gateway, to implement the dual sound source audio data processing method. The network device such as the server or the gateway may be a computer device.

This embodiment provides a dual sound source audio data processing method, including: obtaining audio data of a same-origin song pair, the same-origin song pair including two songs having a same accompaniment but sung in different manners; separately decoding the audio data of the same-origin song pair, to obtain two pieces of mono audio data; combining the two pieces of mono audio data to one piece of two-channel audio data; and dividing play time corresponding to a two-channel audio to multiple play periods, and performing the energy suppression on a left audio channel or a right audio channel of the two-channel audio in different play periods.

Figure 2:
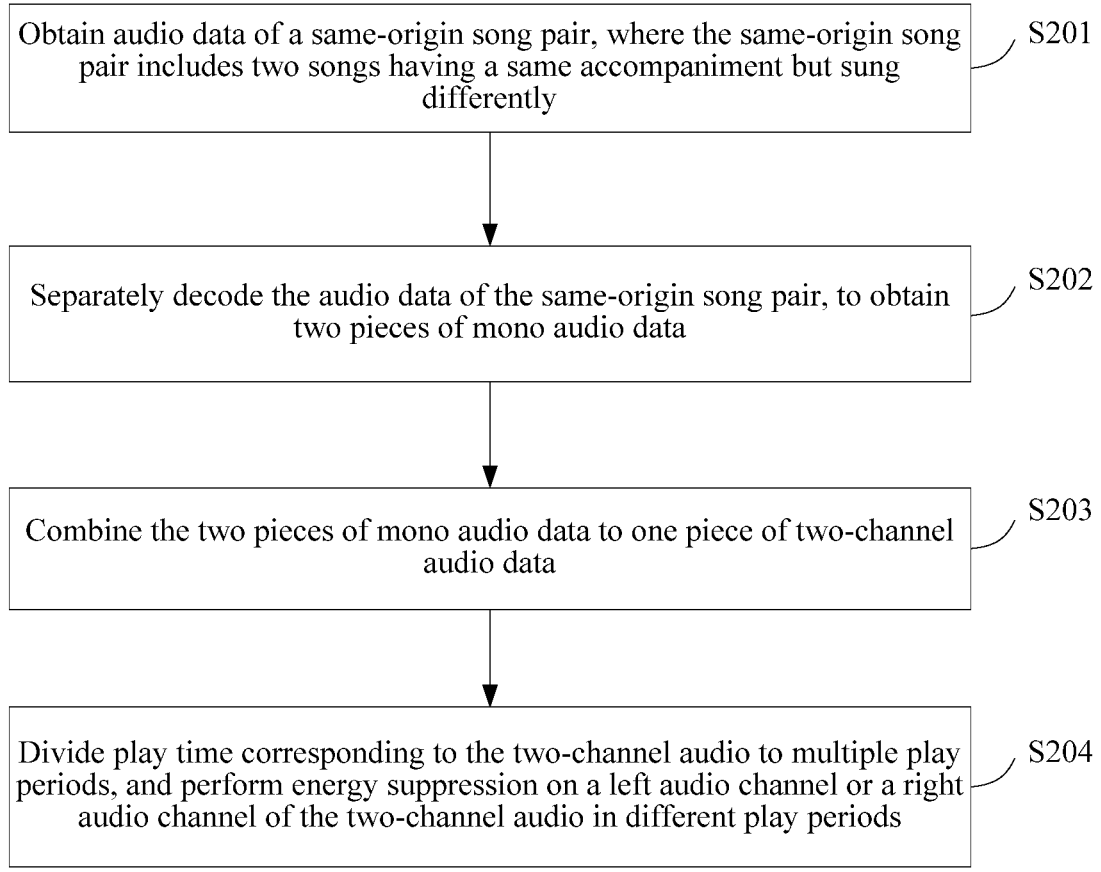
FIG. 2 is a schematic flowchart of a dual sound source audio data processing method according to an embodiment.

Referring to FIG. 2, FIG. 2 is a schematic flowchart of a dual sound source audio data processing method according to an embodiment. The method includes the following steps:

S201: Obtain audio data of a same-origin song pair.

The same-origin song pair includes two songs having a same accompaniment but sung differently. The sung differently means singers are different or singing languages are different. In this embodiment, a same-origin song pair may include two songs obtained after a same song is sung in different languages by a same singer, for example, "Red Rose" sung in Mandarin and "White Rose" sung in Cantonese by Eason Chan. The "Red Rose" and the "White Rose" sung in different singing languages but having a same accompaniment may be used as the same-origin song pair. In another embodiment, the same-origin song pair may also include two songs obtained after a song is sung by different singers. For example, Megan Nicole and Alex both have sung a song "Maps", and the song "Maps" sung by Megan Nicole and the song "Maps" sung by Alex may be used as the same-origin song pair. In conclusion, two songs using a same accompaniment but sung differently in the song database are found to form a song pair.

S202: Separately decode the audio data of the same-origin song pair, to obtain two pieces of mono audio data.

S203: Combine the two pieces of mono audio data to one piece of two-channel audio data.

S204: Divide play time corresponding to a two-channel audio to multiple play periods, and perform energy suppression on a left audio channel or a right audio channel of the two-channel audio in different play periods.

Specifically, the play time corresponding to the two-channel audio includes time information of each sentence of lyrics. In this embodiment, the time information may be a start time and an end time of each sentence of lyrics. Alternatively, the time information may also be a start time and duration of each sentence of lyrics. Specifically, the play time may be divided to multiple play periods according to the time information of each sentence of lyrics, where a quantity of play periods are consistent with sentences included in the lyrics, so that an effect that a song is sung alternately by two types of sound is achieved. The lyrics may also be divided to multiple paragraphs, and the play periods are divided with reference to the paragraphs of the lyrics. That is, one or more lyrics sentences are used as a paragraph, a start time of each sentence of lyrics in the paragraph is used as a start time of the play period, and an end time corresponding to a last sentence of the lyrics in the paragraph is used as an end time of the play period, to implement an effect that a song is sung alternately by two types of sound.

Energy suppression is performed on the left audio channel and the right audio channel on the two-channel audio alternately in different play periods. In this embodiment, suppression may be performed alternately on the left audio channel and the right audio channel in different play periods; or energy suppression may be performed separately on the left audio channel or the right audio channel with reference to a preset rule. For example, a same audio channel is suppressed in continuous multiple play periods, or suppression is not performed on both of the left audio channel and the right audio channel in some play periods, or energy suppression is performed on the left audio channel or the right audio channel only in partial time of a play period. The energy suppression is performed on the left audio channel or the right audio channel only in partial time of a play period, so that it is achieved that a song part corresponding to a same play period is sung alternately by two types of sound. For example, sound A sings the former part of a lyrics sentence, sound B sings the latter part of the lyrics sentence.

A specific method of performing the energy suppression on an audio in any play period includes the following steps:

In a preset time period before a play period is entered, a fade-out effect is performed on an audio channel on which energy suppression is to be performed. In the play period, audio collection points of the audio channel on which energy suppression is to be performed are all set to be 0. In a preset time period after the play period is exited, the fade-out effect is performed on the audio channel.

Further, after step S204 is performed, processed audio data may further be presented to a user, so that the user can listen to the audio.

Figure 3:
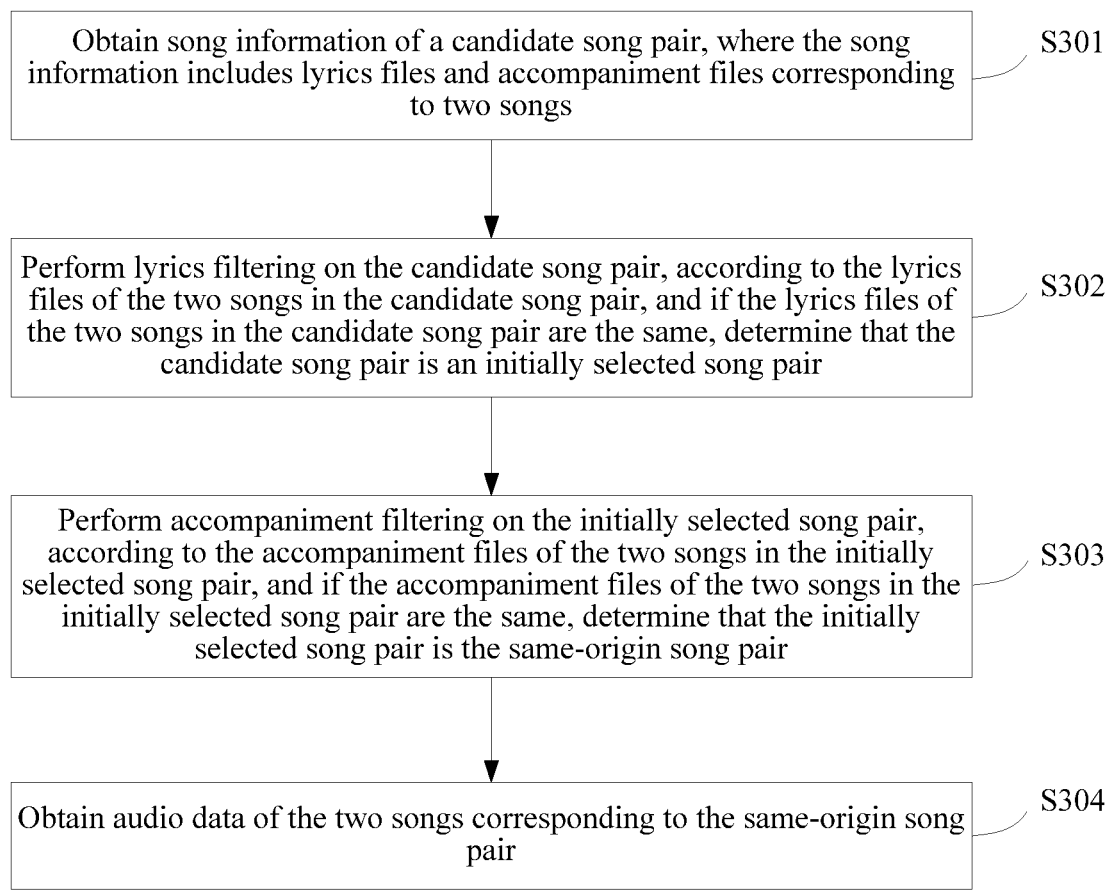
FIG. 3 is a schematic flowchart of a method of obtaining a same-origin song pair according to an embodiment.

Referring to FIG. 3, FIG. 3 is a schematic flowchart of a method of obtaining a same-origin song pair according to an embodiment. The method includes the following steps:

S301: Obtain song information of a candidate song pair, where the song information includes lyrics files and accompaniment files corresponding to two songs.

After song information of the candidate song pair is obtained, a song pair list may be established according to the song information of the candidate song pair. Specifically, the song information of the candidate song pair may be obtained by using the method in the following embodiment.

In an embodiment, all songs having a same song name but sung by singers having different names are searched in a song database, all the obtained songs are combined into pairs each having two songs, so that the candidate song pair is obtained, and the song information of the candidate song pair is extracted.

For example, all songs having a song name "Love" are searched in QQ Music library, and a search result includes "Love" sung by Little Tigers, "Love" sung by Karen Mok, and "Love" sung by TFBOYS. According to a rule of combining songs into pairs each having two songs, the "Love" sung by Little Tigers and the "Love" sung by Karen Mok may be used as a candidate song pair, the "Love" sung by Little Tigers and the "Love" sung by TFBOYS may be used as a candidate song pair, and the "Love" sung by Karen Mok and the "Love" sung by TFBOYS may be used as a candidate song pair.

In another embodiment, songs marked with a language label are searched in all songs of a same singer, where the language label includes a song name and a language version. One of the songs marked with the language label and another song corresponding to the song name in the language label are used as a candidate song pair, and song information of the candidate song pair is obtained.

For example, in a song list of a singer Eason Chan, a language label of a song "White Rose" is found to be "Red Rose" of a Cantonese version, so that the "White Rose" and the "Red Rose" corresponding to the language label may be used as a candidate song pair.

S302: Perform lyrics filtering on the candidate song pair, according to the lyrics files of the two songs in the candidate song pair, and if the lyrics files of the two songs in the candidate song pair are the same, determine that the candidate song pair is an initially selected song pair.

Specifically, lyrics of the candidate song pair may be filtered by using the following method.

First, the lyrics files of the two songs in the candidate song pair are parsed separately, to obtain a lyrics sentences quantity of each song and time information corresponding to each sentence of lyrics, where the time information may include a start time and an end time of each sentence of lyrics. Alternatively, the time information may also include a start time of each sentence of lyrics and duration that the lyrics being sung. Then, whether the lyrics sentences quantities in the two songs are the same are determined, and if not, a corresponding candidate song pair is abandoned, or if yes, lyrics sentences of the two songs are made to one by one, to determine whether the time information of the corresponding lyrics sentences in the two songs is the same, and if it is different, the corresponding candidate song pair is abandoned, or if it is the same, the candidate song pair is used as the initially selected song pair.

S303: Perform accompaniment filtering on the initially selected song pair, according to the accompaniment files of the two songs in the initially selected song pair, and if the accompaniment files of the two songs in the initially selected song pair are the same, determine that the initially selected song pair is the same-origin song pair.

Figure 4:
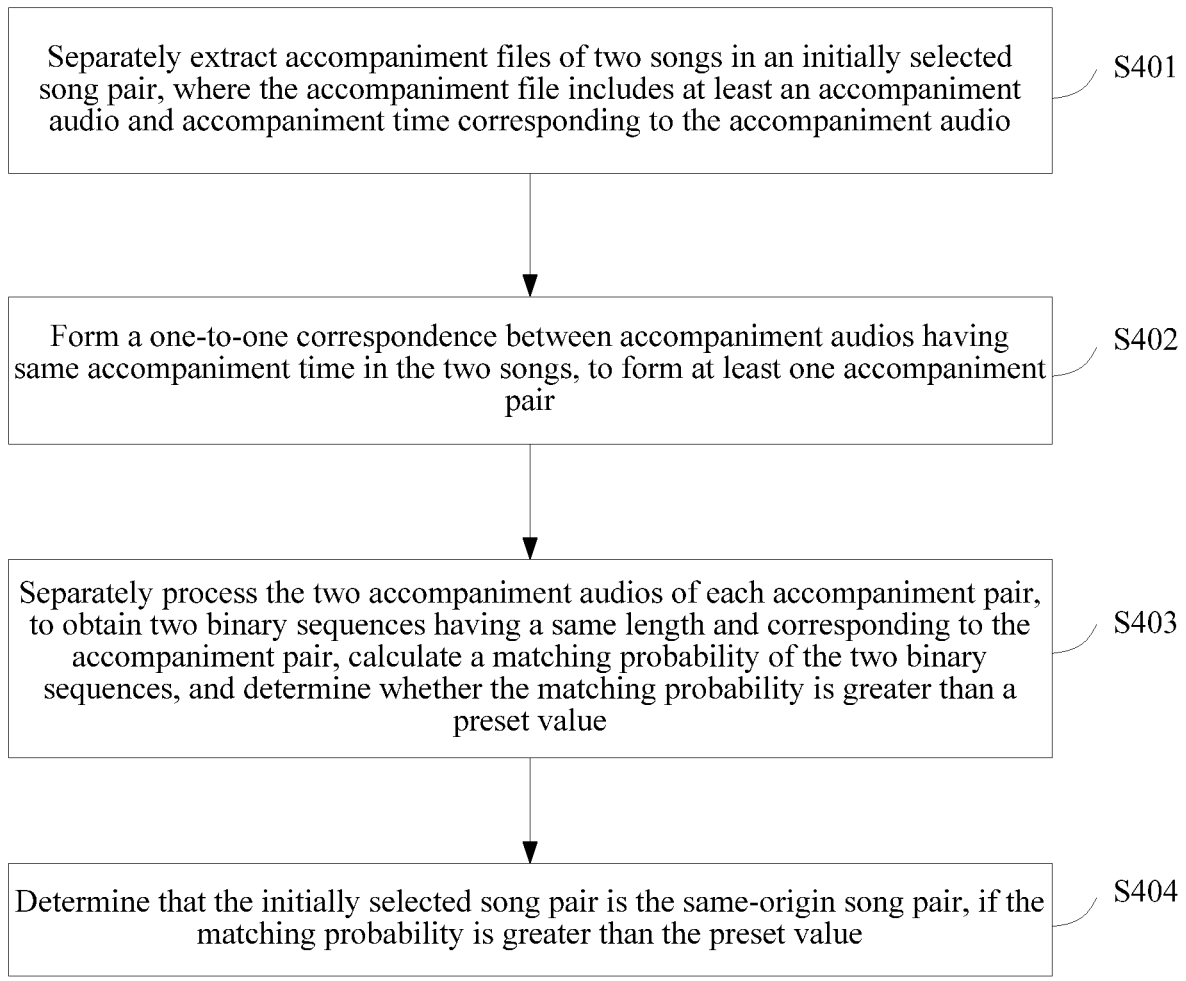
FIG. 4 is a schematic flowchart of a method of filtering an accompaniment of an initially selected song pair according to an embodiment.

Referring to FIG. 4, an accompaniment of the candidate song pair may be filtered by the following method.

S401: Separately extract accompaniment files of the two songs in the initially selected song pair, where the accompaniment file includes at least an accompaniment audio and accompaniment time corresponding to the accompaniment audio.

S402: Make accompaniment audios having same accompaniment time in the two songs one by one, to form at least one accompaniment pair.

S403: Separately process the two accompaniment audios of each accompaniment pair, to obtain two binary sequences having a same length and corresponding to the accompaniment pair, calculate a matching probability of the two binary sequences, determine whether the matching probability is greater than a preset value, and if yes, determine that the two accompaniment audios of the accompaniment pair are the same.

A specific method of determining whether the two accompaniment audios of the accompaniment pair are the same includes: separately performing Fourier transform on the two accompaniment audio data, to generate two spectrums; equally dividing the two spectrums to same quantities of frequency bands, separately calculating an average energy value of each frequency band in each spectrum, comparing sizes of each frequency band and a previous frequency band, and expressing a comparison result in a binary system, to obtain a binary sequence corresponding to the spectrum; calculating a matching probability of the two binary sequences, where the matching probability is $$\frac{m}{n},$$

n represents a total quantity of digits in the binary sequences, and m represents a quantity of digit positions at which the two binary sequences have identical digits, determining whether the matching probability is greater than a preset value, and if yes, determining that the two accompaniment audios of the accompaniment pair are the same.

S404: Determine whether the two accompaniment audios of each accompaniment pair are the same, and if yes, determine that the initially selected song pair is the same-origin song pair.

S304: Obtain audio data of the two songs corresponding to the same-origin song pair.

The audio data of the two songs forming the same-origin song pair is obtained from a song database.

The manner shown in FIG. 3 is merely one of multiple methods of obtaining the same-origin song pair, and should not be understood as to limit the present disclosure.

According to the method described in a first embodiment, the following further provides detailed descriptions by using an example.

This embodiment divides the dual sound source audio data processing method to two main aspects, where one aspect is about filtering the same-origin song pair, and another aspect is about synthesizing the audio data of the same-origin song pair. The two aspects are separately described below with reference to an example.

The same-origin song pair is formed by two songs having a same accompaniment but sung differently. Filtering the same-origin song pair is that, two songs having a same accompaniment but sung differently are found and combined into pairs each having two songs.

In this embodiment, candidate song pairs may be found in a song database when the same-origin song pair is filtered, so that a song pair list is established. Searching for a candidate song in the song database may be performed by using the following methods.

A first method is to, in a song list of a same singer, check whether a song has a language label. For example, a language label of a song "White Rose" is "Red Rose" of a Cantonese version, so that the "White Rose" and the "Red Rose" may be used as a candidate song pair, and are separately recorded as a song x and a song y.

A second method is to search all songs having a same song name but sung by singers having different names in a song database, and combine all the obtained songs into pairs each having two songs. For example, "Love" sung by Little Tigers, "Love" sung by Karen Mok and "Love" sung by TFBOYS are combined into pairs each having two songs, to obtain three candidate song pairs, and two songs of each candidate song pair are separately recorded as a song x and a song y.

For all candidate song pairs found in the foregoing embodiment, it is uncertain that a same accompaniment is used. For example, "Love" sung by Little Tigers and "Love" sung by Karen Mok have a same title, but they are not a same song. Therefore, it is uncertain that a condition that the accompaniment is the same is met and accompaniments of the candidate song pairs are to be filtered. The following is a description of specific steps of filtering the accompaniments by using the "White Rose" and the "Red Rose" sung by Eason Chan as an example.

For songs x and y, corresponding lyrics files $x^1$ and $y^1$ are separately found in a song database, where a format of the lyrics files may specifically include lyrics corresponding to the songs, and time information corresponding to each sentence of lyrics. The time information may be a start time and an end time of each sentence of lyrics, and may be a start time and duration of each sentence of lyrics. As shown in FIG. 5(a) and FIG. 5(b), FIG. 5(a) and FIG. 5(b) separately shows lyrics files of the "White Rose" and the "Red Rose". A format of the lyrics file is that, the start time is in the front of each line and corresponding lyrics are in the back of each line, and time information corresponding to each sentence of lyrics may be obtained by parsing the lyrics files. As shown in FIG. 5, except for a song name and information of a lyrics writer and a composer, a start time of a first sentence of the lyrics of the "Red Rose" and a first sentence of the lyrics of the "White Rose" is both [00:16.28], and an end time is both [00:18.65]. The first sentence of the lyrics of the "Red Rose" is represented by "aaaaaaaaa" and the first sentence of the lyrics of the "White Rose" is represented by "bbbbbbbbb", and other lyrics sentences are represented by "xx . . . ". By means of similarity matching, if lyrics sentences corresponding to the two songs are the same and both a start time and an end time of each sentence of lyrics are the same, it is determined that the songs x and y meet a lyrics filtering condition, and a candidate song pair including the songs x and y may be used as an initially selected song pair and enters accompaniment filtering of the next turn. On the contrary, the candidate song pair is deleted from the song pair list.

An accompaniment of the initially selected song pair is filtered. A common song has several relatively long parts having no lyrics and in which only an accompaniment is played, such as a prelude, an interval of two paragraphs and an end part, and a lyrics file of the accompaniment part only displays time information without lyrics, as content in a line box shown in FIG. 6. In the song "Red Rose", there are four parts displaying only time but having no lyrics, and according to this feature, it can be directly parsed that the song only has an accompaniment in the part of [00:08.61]-[00:16.28]. It is assumed that the songs x and y use a same accompaniment, the two songs tend to be the same at the parts having no lyrics (because an amount of energy and encoding/decoding may both affect an accompaniment part, it has a relatively low probability that the accompaniment parts are totally the same). Based on this theory, comparison of audios of the songs x and y may be performed. In this embodiment, specific steps for comparing audios of the songs x and y is as follows:

selecting audios only having time information but having no lyrics in lyrics files corresponding to the songs x and y, for example, four accompaniment parts may be selected from the "Red Rose", and the audios are respectively $x_i$, $i \in (1,4)$ and $y_i$, $i \in (1,4)$. Because lyrics filtering have been performed, it may be determined when i is determined, time of $x_i$ and $y_i$ is the same. Because a processing manner of each pair of $x_i$ and $y_i$ is the same, only $x_1$ and $y_1$ are used as an example subsequently;

separately decoding $x_1$ and $y_1$ to an 8k16 bit audio;

performing Fourier transform by using 1024 collection points as a frame length, and using 32 collection points as a frame shift, to obtain a spectrum;

equally dividing a 4k spectrum to 32 frequency bands, calculating an average value for each frequency band, and using the calculated average value as energy of the frequency band;

comparing a size relationship between each frequency band and a frequency band corresponding to a former frame, and if a size of a frequency band is larger than that of a former frame, the size relationship is represented by 1, or if smaller, the size relationship is represented by 0, to obtain 32 bit values representing each frame, and separately performing an operation on $x_1$ and $y_1$, to obtain two binary sequences having a same length and corresponding to $x_1$ and $y_1$;

making binary sequences of $x_1$ and $y_1$ be in one-to-one comparison, calculating a matching probability of the two binary sequences, where the matching probability may be represented as $$\frac{m}{n},$$

n represents a total quantity of digits in the binary sequences, and m represents a quantity of digit positions at which the two binary sequences have identical digits (if digit positions at which digits in the two binary sequences are both 0 or both 1 at the same time, it is determined that the digits are the same), comparing the matching probability with a preset value k, and if the matching probability is not less than the preset value k, matching is succeed, and accompaniments $x_1$ and $y_1$ tend to be the same. Theoretically, if accompaniments $x_1$ and $y_1$ are the same, the matching probability should be 1. Because an amount of energy and encoding/decoding may both affect an accompaniment part, a preset value k is set to determine similarity of accompaniments $x_1$ and $y_1$, and a probability that accompaniments $x_1$ and $y_1$ are the same is becoming larger if the matching probability levels off to 1, such as k=0.9.

If all $x_i$ and $y_i$ of two songs x and y of an initially selected song pair are successful matched, accompaniments of the two songs in the initially selected song pair are the same, and the initially selected is used as a same-origin song pair. On the contrary, the initially selected song pair is deleted from a song pair list.

By means of lyrics filtering and accompaniment filtering, left song pairs in the song pair list are all same-origin song pairs. To achieve an effect that each pair of same-origin songs are sung by two types of sound alternately, synthesizing processing is to be performed on audio data of the same-origin song pair. For ease of description, a synthesizing processing method of a same-origin song pair including two songs x and y is described below.

In this embodiment, synthesizing processing steps of the songs x and y are as follows:

decoding the audio data of the song x and the song y to a piece of 44k16 bit mono audio data;

combining two pieces of mono audio data of x and y to one piece of two-channel audio data, where left and right audio channels can be randomly allocated. In this way, when listening to music by wearing a headset or a speaker, a user may find that music heard by two ears of the user has a same accompaniment but is sung differently.

Music synthesized by the foregoing processing is listened to be noisy, to achieve an effect of being sung alternately, time of all lyrics sentences may be divided to n time period $t_i$ i∈(1,n) according to time stamps of lyrics information, where n is a quantity of lyrics sentences (only sentences sung are included, and information of a lyrics writer and a composer and lines of an accompaniment are not included). As "Red Rose" shown in FIG. 5, $t_1$ is ([00:16.28]-[00:18.65]), $t_2$ is ([00:18.65]-[00:23.53]) . . . , energy suppression is performed on a left audio channel in a $t_i$ (i is an odd number) time period, and energy suppression is performed on a right audio channel in a $t_i$ (i is an even number) time period. In this way, an effect that different person voices sing on the left and right audio channels alternately is achieved. In this embodiment, suppression for a $t_i$ time period includes three steps, and a specific method is as follows (using $t_1$ as an example):

In a first step, fade-out is performed: a fade-out effect is generated one second before $t_1$, a specific time period is ([00:15.28]-[00:16.28]), and a sampling rate is 44100, so that an audio on the left audio channel has 44100 collection points, an energy value is $k_i$ i∈(1,44100) in this second, and a new energy value after the fade-out is performed is $$p_i = \frac{k_i * (44100 - i)}{44100};$$

In a second step, all collection points in $t_1$ time period [00:16.28]-[00:18.65] are set to be 0;

In a third step, fade-in is performed: a fade-in effect is generated one second after $k_i$ i∈(1,44100), a specific time period is ([00:18.65]-[00:19.65]), and a sampling rate is 44100, so that an audio on the left audio channel has 44100 collection points, an energy value is $k_i$ i∈(1,44400) in this second, and a new energy value after the fade-in is performed is $$p_i = \frac{k_i * i}{44100};$$

In an embodiment, two songs having a same accompaniment but sung differently are used as a same-origin song pair. Two pieces of mono audio data are obtained by decoding audio data of the same-origin song pair, and the two pieces of mono audio data are combined to one piece of two-channel audio data. Play time corresponding to the two-channel audio are divided into multiple play periods, and energy suppression are performed on a left audio channel or a right audio channel of the two-channel audio in different play periods, so that an effect that the two songs having a same accompaniment but sung differently are sung alternately is achieved. This embodiment provides a novelty solution that music is automatically synthesized, to provide a new function for a computer device, and the solution has advantages of low costs and high synthesizing efficiency.

To implement the dual sound source audio data processing method according to the embodiments, an embodiment further provides a dual sound source audio data processing apparatus. Nouns have meanings the same as that in the foregoing processing method of the audio data, and for specific implementation details, reference may be made to the description in the method embodiments.

Figure 7:
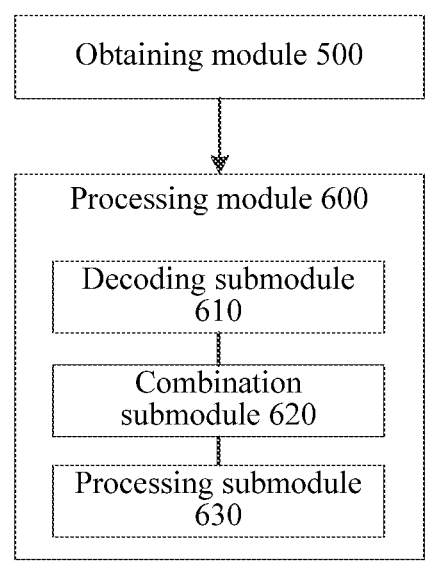
FIG. 7 is a schematic structural diagram of a dual sound source audio data processing apparatus according to an embodiment.

Referring to FIG. 7, FIG. 7 is a schematic structural diagram of a dual sound source audio data processing apparatus according to an embodiment. The apparatus includes an obtaining module 500 and a processing module 600.

The obtaining module 500 is configured to obtain audio data of a same-origin song pair.

The processing module 600 includes a decoding submodule 610, a combination submodule 620 and a processing submodule 630. The decoding submodule 610 is configured to separately decode the audio data of the same-origin song pair, to obtain two pieces of mono audio data; the combination submodule 620 is configured to combine the two pieces of mono audio data to one piece of two-channel audio data; and the processing submodule 630 is configured to divide play time corresponding to a two-channel audio to multiple play periods, and perform energy suppression on a left audio channel or a right audio channel of the two-channel audio in different play periods.

Figure 8:
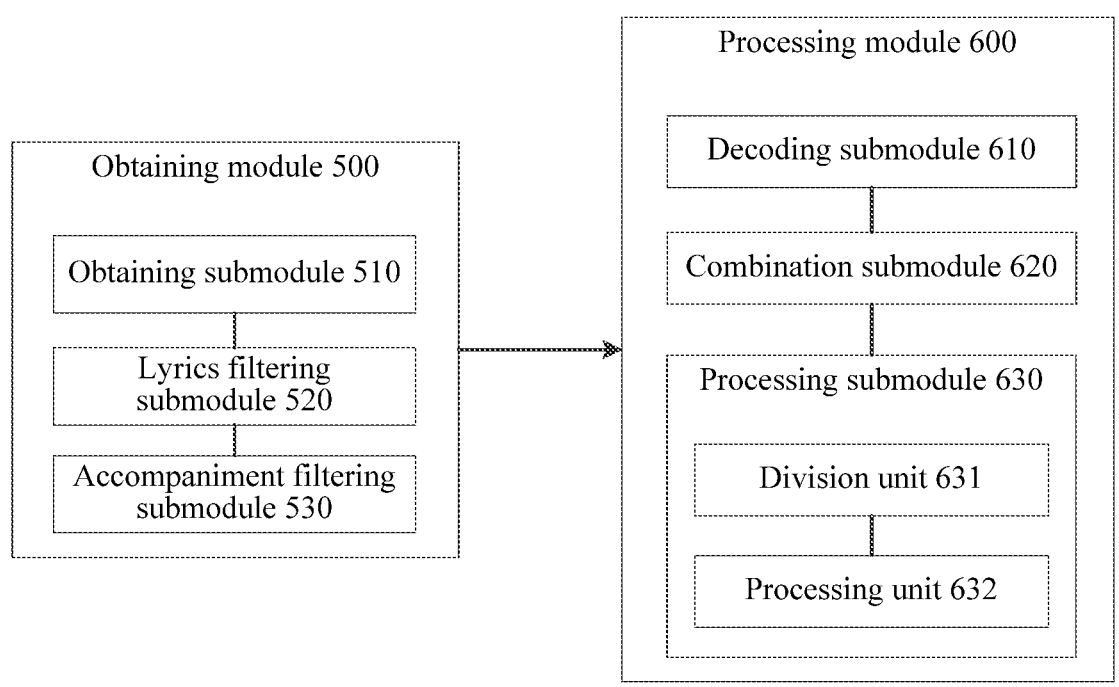
FIG. 8 is a schematic structural diagram of a dual sound source audio data processing apparatus according to an embodiment.

The same-origin song pair includes two songs having a same accompaniment but sung differently. In this embodiment, the same-origin song pair may include two songs obtained after a same song is sung by a same singer in different languages, or may include two songs obtained after a same song is sung by different singers. Referring to FIG. 8, the obtaining module 500 used to obtain the same-origin song pair specifically includes an obtaining submodule 510, a lyrics filtering submodule 520 and an accompaniment filtering submodule 530. The obtaining submodule 510 is configured to obtain song information of a candidate song pair, where the song information includes lyrics files and accompaniment files corresponding to the two songs; the lyrics filtering submodule 520 is configured to perform lyrics filtering on the candidate song pair, according to the lyrics files of the two songs in the candidate song pair, and if the lyrics files of the two songs in the candidate song pair are the same, determine that the candidate song pair is an initially selected song pair; and the accompaniment filtering submodule 530 is configured to perform accompaniment filtering on the initially selected song pair, according to the accompaniment files of the two songs in the initially selected song pair, and if the accompaniment files of the two songs in the initially selected song pair are the same, determine that the initially selected song pair is the same-origin song pair.

The lyrics file is lyrics sentences in a song and time information of each sentence of lyrics and the accompaniment file is the part including only music but having no lyrics and is not sung.

Figure 9:
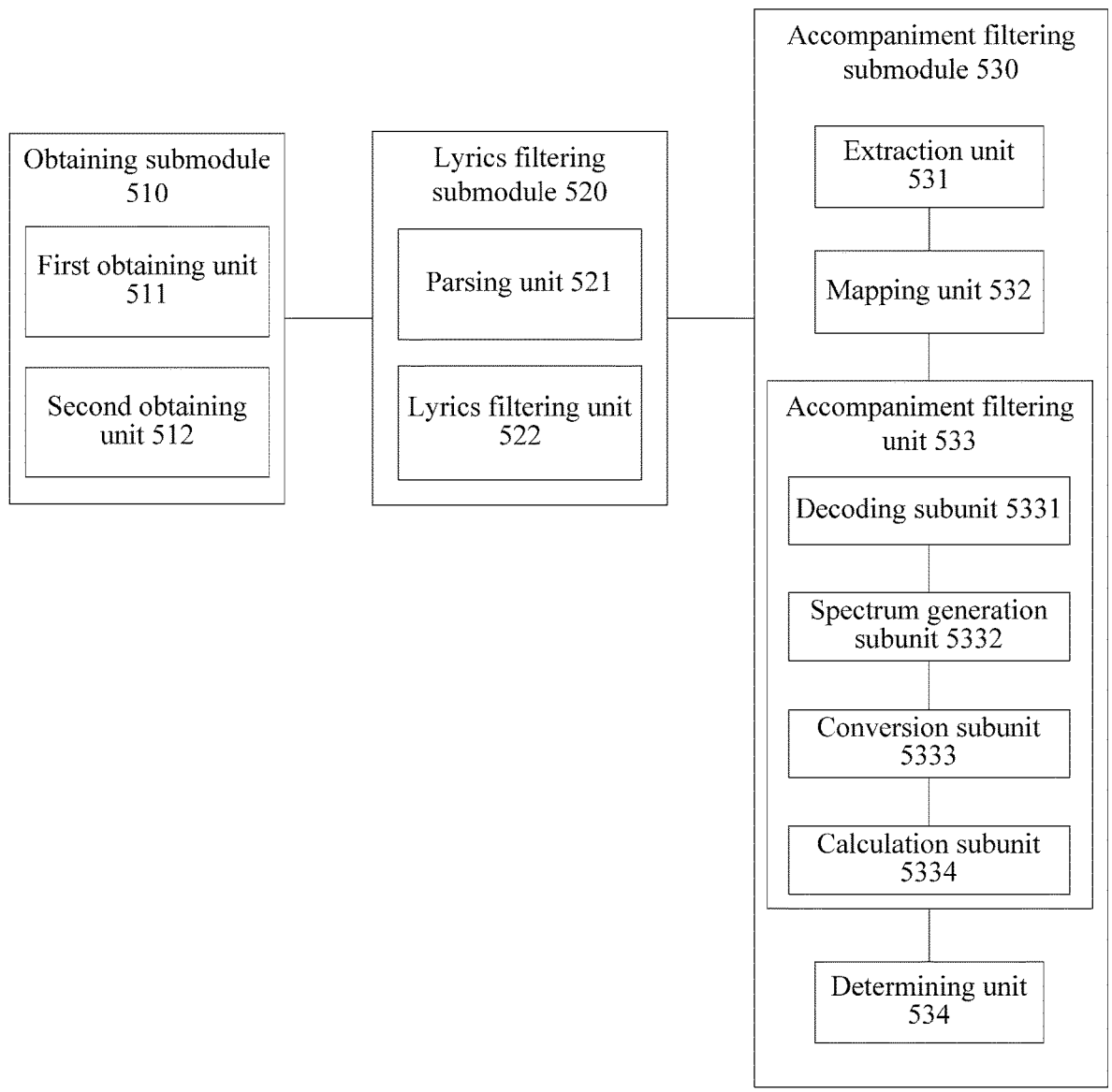
FIG. 9 is a schematic structural diagram of an obtaining module of an audio data processing apparatus according to an embodiment.

Referring to FIG. 9, FIG. 9 is a schematic structural diagram of an obtaining module 500 of an audio data processing apparatus according to an embodiment.

In a possible implementation, the obtaining submodule 510 may include a first obtaining unit 511 and a second obtaining unit 512; the first obtaining unit 511 is configured to search all songs having a same song name and sung by singers having different names in a song database, and combine all the obtained songs into pairs each having two songs, to obtain a candidate song pair; the second obtaining unit 512 is configured to search songs marked with a language label in songs of a same singer, where the language label includes a song name and a language version, and use one of the songs marked with the language label and another song corresponding to the song name in the language label as the candidate song pair. The lyrics filtering submodule 520 may include a parsing unit 521 and a lyrics filtering unit 522, where the parsing unit is configured to separately parse lyrics files of the two songs in the candidate song pair, to obtain a quantity of lyrics sentences of each song and time information corresponding to each sentence of lyrics, where the time information includes a start time and an end time of each sentence of lyrics; and the lyrics filtering unit is configured to determine whether the quantities of lyrics sentences of the two songs in the candidate song pair are the same, and if yes, make the lyrics sentences of the two songs one by one, to determine whether the time information of the lyrics in a correspondence and in the two songs is the same, and if yes, use the candidate song pair as the initially selected song pair. The accompaniment filtering submodule 530 may include an extraction unit 531, a mapping unit 532, an accompaniment filtering unit 533 and a determining unit 534. The extraction unit 531 is configured to separately extract the accompaniment files of the two songs in the initially selected song pair, where the accompaniment files includes at least an accompaniment audio and accompaniment time corresponding to the accompaniment audio; the mapping unit 532 is configured to make accompaniment audios having same accompaniment time in the two songs one by one, to form at least one accompaniment pair; the accompaniment filtering unit 533 is configured to separately process the two accompaniment audios of each accompaniment pair, to obtain two binary sequences having a same length and corresponding to the accompaniment pair, calculate the matching probability of the two binary sequences, determine whether the matching probability is greater than a preset value, and if yes, determine that the tow accompaniment audios of the accompaniment pair are the same; and the determining unit 534 is configured to determine whether the two accompaniment audios of each accompaniment pair are the same, and if yes, determine that the initially selected song pair is the same-origin song pair.

In a possible implementation, the accompaniment filtering unit 533 includes a decoding subunit 5331, a spectrum generation subunit 5332, a conversion subunit 5333 and a calculation subunit 5334, where the decoding subunit 5331 is configured to decode the two accompaniment audios of each accompaniment pair, to obtain two pieces of accompaniment audio data; the spectrum generation subunit 5332 is configured to separately perform Fourier transform on the two pieces of accompaniment audio data, to generate two spectrums; and the conversion subunit 5333 is configured to equally divide the two spectrums to same quantities of frequency bands, separately calculate an average energy value of each frequency band in each spectrum, compare sizes of each frequency band and a previous frequency band, and express a comparison result in a binary system, to obtain a binary sequence corresponding to the spectrum;

the calculation subunit 5334 is configured to calculate the matching probability of the two binary sequences, where the matching probability is $$\frac{m}{n},$$

n represents a total quantity of digits in the binary sequences, and m represents a quantity of digit positions at which the two binary sequences have identical digits, determining whether the matching probability is greater than a preset value, and if yes, determine that the two accompaniment audios of the accompaniment pair are the same.

Further, in a possible implementation, the processing submodule 630 includes a division unit 631 and a processing unit 632, where the division unit 631 is configured to divide play time of a two-channel audio to multiple play periods according to time information of each sentence of lyrics in the two-channel audio, and a quantity of play periods is consistent with a quantity of lyrics sentences; and the processing unit 632 is configured to perform energy suppression on a left audio channel and a right audio channel on the two-channel audio alternately in different play periods.

After dual sound source audio data is processed, obtained audio data may further be transmitted to a user terminal, and displayed to the user.

The dual sound source audio data processing apparatus may specifically integrated on a network device such as a server or a gateway.

During specific implementation, the foregoing units may be implemented as independent entities, or may be combined arbitrarily, or may be implemented as a same entity or several entities. For specific implementation of the foregoing units, refer to the foregoing method embodiments. Details are not described herein again.

It can be learned from the above, the dual sound source audio data processing apparatus according to this embodiment first filters two songs having a same accompaniment but sung differently in a song database as a same-origin song pair, performs decoding and combining processing of audio data of the same-origin song pair, to obtain two-channel audio data, divides play time corresponding to a two-channel audio into multiple play periods, and performs energy suppression on a left audio channel or a right audio channel of the two-channel audio in different play periods, so that an effect that a song is sung by two voices alternately is achieved. This embodiment provides a novelty music synthesizing apparatus, to provide a new function for a computer device, and the solution has advantages of high synthesizing efficiency and low costs.

In the foregoing embodiments, the descriptions of the embodiments have respective focuses, for the part that is not described in detail in an embodiment, reference may be made to the foregoing detailed description of the dual sound source audio data processing method, and details are not described herein again.

In this embodiment, an audio data processing apparatus such as a computer, a tablet computer, and a mobile phone having a touch function is provided. The audio data processing apparatus and the audio data processing method in the foregoing embodiment belong to a same conception, and any method provided in the audio data processing method embodiment may be performed on the audio data processing apparatus. A specific implementation process thereof is shown in the audio data processing method embodiment, and details are not described herein again.

Figure 10:
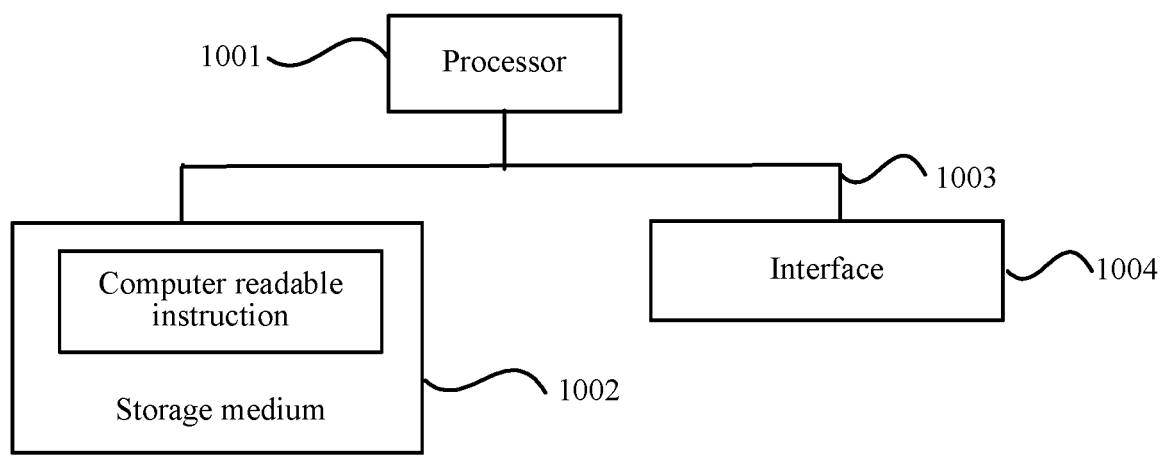
FIG. 10 is a schematic diagram of hardware structure of a dual sound source audio data processing apparatus according to an embodiment.

FIG. 10 is a schematic diagram of hardware structure of a dual sound source audio data processing apparatus according to an embodiment. As shown in FIG. 10, the apparatus may include: one or more (only one is shown in the figure) processors 1001, a storage medium 1002, a bus 1003 and an interface 1004.

The storage medium 1002 may be used for storing one or more computer readable instructions, such as a software program and a module, and such as a program instruction/module corresponding to a dual sound source audio data processing method and apparatus in the embodiments. The processor 1001 is connected to the storage medium 1002 by the bus 1003 and operates the software program and the module stored in the storage medium 1002, so that various function applications and data processing are executed. That is, the audio data processing method is implemented. The storage medium 1002 may include a high-speed random memory, and may also include a nonvolatile memory such as one or more magnetic storage devices, a flash memory, or another nonvolatile solid-state memory. In some instances, the storage medium 1002 may further include memories remotely disposed relative to the processor 1001, and these remote memories may be connected to the terminal through a network. Instances of the network include but are not limited to, the Internet, an intranet, a local area network, a mobile communications network, and a combination thereof. The interface 1004 is connected to the processor 1001 by a bus, receives an instruction of the processor 1001, and receives data of an external device or sends data to the external device according to the instruction.

It should be noted that, for the dual sound source audio data processing method described in the embodiments, a person of ordinary skill in the art may understand that, implementing all or parts of procedures of the audio data processing method described in the embodiments can be completed by controlling related hardware by using a computer program, where the computer program may be stored in a computer readable storage medium, for example, being stored in a memory of the server shown in FIG. 1, and is executed by at least one processor in the server. An execution process may include a procedure of the embodiment of the audio data processing method. The server may be a computer device. The foregoing storage medium may include a magnetic disk, an optical disc, a read-only memory (ROM, Read Only Memory), or a random access memory (RAM, Random Access Memory).

Therefore, an embodiment provides a non-volatile computer readable storage medium that stores a computer program. The computer program can cause a computer to execute the step of the dual sound source audio data processing method described in the foregoing embodiment.

For the audio data processing apparatus in the embodiments, the functional modules thereof may be integrated into one processing chip, or each of the modules may exist alone physically, or two or more modules may be integrated into one module. The integrated module may be implemented in a form of hardware, or may be implemented in a form of a software functional module. When being implemented in the form of a software functional module and sold or used as an independent product, the integrated module may be stored in a computer readable storage medium. The storage medium is, for example, an ROM, a magnetic disk, or an optical disc.

A dual sound source audio data processing method and apparatus provided in the embodiments are described in detail above. The principle and implementations of the present disclosure are described herein by using specific examples. The descriptions of the embodiments are merely used for helping understand the method and core ideas of the present disclosure. In addition, a person skilled in the art can make variations to the present disclosure in terms of the specific implementations and application scopes according to the ideas of the present disclosure. Therefore, the content of the specification shall not be construed as a limit to the present disclosure or the accompanying claims.

What is claimed is:

1. A method comprising:
    obtaining, by at least one processor, audio data of a song pair comprising a first song and a second song, the first and second songs having a same accompaniment audio but different voice audio;
    decoding the audio data to obtain first mono audio data from the audio data corresponding to the first song and second mono audio data from the audio data corresponding to the second song;
    combining the first and second mono audio data to one piece of two-channel audio data comprising a left audio channel and a right audio channel; and
    dividing a play time of the two-channel audio data into a plurality of play periods, and selectively performing energy suppression on the left audio channel and the right audio channel in different play periods of the plurality of play periods,
    wherein the obtaining comprises:
    obtaining song information of a first candidate song and a second candidate song from a plurality of candidate songs, the song information of each of the first and second candidate songs comprising a lyrics file and an accompaniment file;
    performing lyrics filtering on the first and second candidate songs, according to the lyrics files of the first and second candidate songs, and when the lyrics files are the same, determining the first and second candidate songs as an initial song pair;
    performing accompaniment filtering on the initial song pair, according to the accompaniment files, and when the accompaniment files are the same, determining the initial song pair is the song pair; and
    obtaining the audio data of the song pair.

2. The method according to claim 1, wherein obtaining the song information comprises:

searching a song database comprising the plurality of candidate songs to obtain songs of the plurality of candidate songs that have a same song name but are sung by singers having different names in a song database, combining all the obtained songs into pairs each having two songs, to obtain a candidate song pair including the first candidate song and the second candidate song, and obtaining the song information of the first candidate song and the second candidate song; or searching the song database to obtain songs of the plurality of candidate songs that are marked with a language label among all songs of a same singer, the language label comprising a song name and a language version, using one of the songs marked with the language label and another song corresponding to the song name in the language label as a candidate song pair including the first candidate song and the second candidate song, and obtaining the song information of the first candidate song and the second candidate song.

3. The method according to claim 1, wherein performing the lyrics filtering comprises:

separately parsing the lyrics files of the first and second candidate songs, to obtain a quantity of lyrics sentences of each of the first and second candidate songs, and time information corresponding to each lyric sentence; and determining whether the quantities of the lyrics sentences are the same, if the quantities are the same, matching the lyrics sentences of the first and second candidate songs one by one, to determine whether the time information of the corresponding lyrics sentences is the same, and if the time information is the same, using the first and second candidate songs as the initial song pair.

4. The method according to claim 1, wherein performing the accompaniment filtering comprises:

separately extracting the accompaniment files of each of the first and second candidate songs in the initial song pair, each accompaniment file comprising at least an accompaniment audio and accompaniment time corresponding to the accompaniment audio;

matching accompaniment audios of the first and second candidate songs in the initial song pair that have a same accompaniment time one by one, to form at least one accompaniment pair;

for each accompaniment pair, separately processing the two accompaniment audios, to obtain two binary sequences having a same length and corresponding to the accompaniment pair, calculating a matching probability of the two binary sequences, determining whether the matching probability is greater than a threshold value, and if the matching probability is greater than the threshold value, determining that the two accompaniment audios of the accompaniment pair are the same; and determining whether the two accompaniment audios of each accompaniment pair are the same, and if the two accompaniment audios of each accompaniment pair are the same, determining that the initial song pair is the song pair.

5. The method according to claim 4, wherein the separately processing comprises:

separately decoding the two accompaniment audios, to obtain two pieces of accompaniment audio data;

separately performing Fourier transform on the two pieces of the accompaniment audio data, to generate two spectrums;

equally dividing the two spectrums to same quantities of frequency bands, separately calculating an average energy value of each frequency band in each spectrum, comparing sizes of each frequency band and a previous frequency band, and expressing a comparison result in a binary system, to obtain a binary sequence corresponding to the spectrum; and calculating a matching probability of the two binary sequences, wherein the matching probability is $$\frac{m}{n},$$

where n represents a total quantity of digits in the binary sequences, and m represents a quantity of digit positions at which the two binary sequences have identical digits, determining whether the matching probability is greater than a threshold value, and if the matching probability is greater than the threshold value, determining that the two accompaniment audios are the same.

6. The method according to claim 3, wherein the play time comprises time information for each lyric sentence of each of the first and second candidate songs, and wherein dividing the play time comprises:

for each of the first and second candidate songs, dividing the play time to a plurality of play periods according to the time information of the lyric sentences of the candidate song, a quantity of the play periods corresponding to the quantity of the lyrics sentences; and performing the energy suppression on the left audio channel and the right audio channel alternately in different play periods of the plurality of play periods.

7. An apparatus comprising:

at least one memory configured to store computer program code; and at least one processor configured to access the at least one memory and operate according to the computer program code, the computer program code including:

obtaining code configured to cause at least one of the at least one processor to obtain audio data of a song pair comprising a first song and a second song, the first and second songs having a same accompaniment audio but different voice audio;

decoding code configured to cause at least one of the at least one processor to decode the audio data to obtain first mono audio data from the audio data corresponding to the first song and second mono audio data from the audio data corresponding to the second song;

combining code configured to cause at least one of the at least one processor to combine the first and second mono audio data to one piece of two-channel audio data comprising a left audio channel and a right audio channel; and dividing code configured to cause at least one of the at least one processor to divide a play time of the two-channel audio data into a plurality of play periods, and selectively performing energy suppression on the left audio channel and the right audio channel in different play periods of the plurality of play periods, wherein the obtaining code further comprises:

first obtaining subcode configured to cause at least one of the at least one processor to obtain song information of a first candidate song and a second candidate song from a plurality of candidate songs, the song information of each of the first and second candidate songs comprising a lyrics file and an accompaniment file;

first performing code configured to cause at least one of the at least one processor to perform lyrics filtering on the first and second candidate songs, according to the lyrics files of the first and second candidate songs, and when the lyrics files are the same, determining the first and second candidate songs as an initial song pair;

second performing code configured to cause at least one of the at least one processor to perform accompaniment filtering on the initial song pair, according to the accompaniment files, and when the accompaniment files are the same, determining the initial song pair is the song pair; and second obtaining subcode configured to cause at least one of the at least one processor to obtain the audio data of the song pair.

8. The apparatus according to claim 7, wherein the first obtaining subcode comprises:

first searching code configured to cause at least one of the at least one processor to search a song database comprising the plurality of candidate songs to obtain songs of the plurality of candidate songs that have a same song name but are sung by singers having different names in a song database, combining all the obtained songs into pairs each having two songs, to obtain a candidate song pair including the first candidate song and the second candidate song, and obtaining the song information of the first candidate song and the second candidate song; or second searching code configured to cause at least one of the at least one processor to search the song database to obtain songs of the plurality of candidate songs that are marked with a language label among all songs of a same singer, the language label comprising a song name and a language version, using one of the songs marked with the language label and another song corresponding to the song name in the language label as a candidate song pair including the first candidate song and the second candidate song, and obtaining the song information of the first candidate song and the second candidate song.

9. The apparatus according to claim 7, wherein the first performing code comprises:

parsing code configured to cause at least one of the at least one processor to separately parse the lyrics files of the first and second candidate songs, to obtain a quantity of lyrics sentences of each of the first and second candidate songs, and time information corresponding to each lyric sentence; and determining code configured to cause at least one of the at least one processor to determine whether the quantities of the lyrics sentences are the same, if the quantities are the same, matching the lyrics sentences of the first and second candidate songs one by one, to determine whether the time information of the corresponding lyrics sentences is the same, and if the time information is the same, using the first and second candidate songs as the initial song pair.

10. The apparatus according to claim 7, wherein the second performing code comprises:

extracting code configured to cause at least one of the at least one processor to separately extract the accompaniment files of each of the first and second candidate songs in the initial song pair, each accompaniment file comprising at least an accompaniment audio and accompaniment time corresponding to the accompaniment audio;

matching code configured to cause at least one of the at least one processor to match accompaniment audios of the first and second candidate songs in the initial song pair that have a same accompaniment time one by one, to form at least one accompaniment pair;

processing code configured to cause at least one of the at least one processor to, for each accompaniment pair, separately process the two accompaniment audios, to obtain two binary sequences having a same length and corresponding to the accompaniment pair, calculating a matching probability of the two binary sequences, determining whether the matching probability is greater than a threshold value, and if the matching probability is greater than the threshold value, determining that the two accompaniment audios of the accompaniment pair are the same; and determining code configured to cause at least one of the at least one processor to determine whether the two accompaniment audios of each accompaniment pair are the same, and if the two accompaniment audios of each accompaniment pair are the same, determining that the initial song pair is the song pair.

11. The apparatus according to claim 10, wherein the processing code comprises:

decoding code configured to cause at least one of the at least one processor to separately decode the two accompaniment audios, to obtain two pieces of accompaniment audio data;

performing code configured to cause at least one of the at least one processor to separately perform Fourier transform on the two pieces of the accompaniment audio data, to generate two spectrums;

dividing code configured to cause at least one of the at least one processor to equally divide the two spectrums to same quantities of frequency bands, separately calculating an average energy value of each frequency band in each spectrum, comparing sizes of each frequency band and a previous frequency band, and expressing a comparison result in a binary system, to obtain a binary sequence corresponding to the spectrum; and calculating code configured to cause at least one of the at least one processor to calculate a matching probability of the two binary sequences, wherein the matching probability is $$\frac{m}{n},$$

where n represents a total quantity of digits in the binary sequences, and m represents a quantity of digit positions at which the two binary sequences have identical digits, determining whether the matching probability is greater than a threshold value, and if the matching probability is greater than the threshold value, determining that the two accompaniment audios are the same.

12. The apparatus according to claim 7, wherein the play time comprises time information for each lyric sentence of each of the first and second candidate songs, and wherein dividing code comprises:

dividing subcode configured to cause at least one of the at least one processor to, for each of the first and second candidate songs, divide the play time to a plurality of play periods according to the time information of the lyric sentences of the candidate song, a quantity of the play periods corresponding to the quantity of the lyrics sentences; and suppression code configured to cause at least one of the at least one processor to perform the energy suppression on the left audio channel and the right audio channel alternately in different play periods of the plurality of play periods.

13. A non-transitory computer readable storage medium storing computer program code executable by at least one processor to:

obtain audio data of a song pair comprising a first song and a second song, the first and second songs having a same accompaniment audio but different voice audio;

decode the audio data to obtain first mono audio data from the audio data corresponding to the first song and second mono audio data from the audio data corresponding to the second song;

combine the first and second mono audio data to one piece of two-channel audio data comprising a left audio channel and a right audio channel; and divide a play time of the two-channel audio data into a plurality of play periods, and selectively performing energy suppression on the left audio channel and the right audio channel in different play periods of the plurality of play periods, wherein the obtaining comprises:

obtaining song information of a first candidate song and a second candidate song from a plurality of candidate songs, the song information of each of the first and second candidate songs comprising a lyrics file and an accompaniment file;

performing lyrics filtering on the first and second candidate songs, according to the lyrics files of the first and second candidate songs, and when the lyrics files are the same, determining the first and second candidate songs as an initial song pair;

performing accompaniment filtering on the initial song pair, according to the accompaniment files, and when the accompaniment files are the same, determining the initial song pair is the song pair; and obtaining the audio data of the song pair.

14. The non-transitory computer readable storage medium according to claim 13, wherein obtaining the song information comprises:

searching a song database comprising the plurality of candidate songs to obtain songs of the plurality of candidate songs that have a same song name but are sung by singers having different names in a song database, combining all the obtained songs into pairs each having two songs, to obtain a candidate song pair including the first candidate song and the second candidate song, and obtaining the song information of the first candidate song and the second candidate song; or searching the song database to obtain songs of the plurality of candidate songs that are marked with a language label among all songs of a same singer, the language label comprising a song name and a language version, using one of the songs marked with the language label and another song corresponding to the song name in the language label as a candidate song pair including the first candidate song and the second candidate song, and obtaining the song information of the first candidate song and the second candidate song.

15. The non-transitory computer readable storage medium according to claim 13, wherein performing the lyrics filtering comprises:

separately parsing the lyrics files of the first and second candidate songs, to obtain a quantity of lyrics sentences of each of the first and second candidate songs, and time information corresponding to each lyric sentence; and determining whether the quantities of the lyrics sentences are the same, if the quantities are the same, matching the lyrics sentences of the first and second candidate songs one by one, to determine whether the time information of the corresponding lyrics sentences is the same, and if the time information is the same, using the first and second candidate songs as the initial song pair.

16. The non-transitory computer readable storage medium according to claim 13, wherein performing the accompaniment filtering comprises:

separately extracting the accompaniment files of each of the first and second candidate songs in the initial song pair, each accompaniment file comprising at least an accompaniment audio and accompaniment time corresponding to the accompaniment audio;

matching accompaniment audios of the first and second candidate songs in the initial song pair that have a same accompaniment time one by one, to form at least one accompaniment pair;

for each accompaniment pair, separately processing the two accompaniment audios, to obtain two binary sequences having a same length and corresponding to the accompaniment pair, calculating a matching probability of the two binary sequences, determining whether the matching probability is greater than a threshold value, and if the matching probability is greater than the threshold value, determining that the two accompaniment audios of the accompaniment pair are the same; and determining whether the two accompaniment audios of each accompaniment pair are the same, and if the two accompaniment audios of each accompaniment pair are the same, determining that the initial song pair is the song pair.

17. The non-transitory computer readable storage medium according to claim 16, wherein the separately processing comprises:

separately decoding the two accompaniment audios, to obtain two pieces of accompaniment audio data;

separately performing Fourier transform on the two pieces of the accompaniment audio data, to generate two spectrums;

equally dividing the two spectrums to same quantities of frequency bands, separately calculating an average energy value of each frequency band in each spectrum, comparing sizes of each frequency band and a previous frequency band, and expressing a comparison result in a binary system, to obtain a binary sequence corresponding to the spectrum; and calculating a matching probability of the two binary sequences, wherein the matching probability is $$\frac{m}{n},$$

where n represents a total quantity of digits in the binary sequences, and m represents a quantity of digit positions at which the two binary sequences have identical digits, determining whether the matching probability is greater than a threshold value, and if the matching probability is greater than the threshold value, determining that the two accompaniment audios are the same.

\* \* \* \* \*